United States Patent [19]

Campbell et al.

[11] 4,072,095
[45] Feb. 7, 1978

[54] TWINE WRAPPING MECHANISM FOR A ROLL FORMING MACHINE

[75] Inventors: Willis R. Campbell, Ephrata; Thomas W. Waldrop, New Holland, both of Pa.

[73] Assignee: Sperry Rand Corporation, New Holland, Pa.

[21] Appl. No.: 718,711

[22] Filed: Aug. 30, 1976

[51] Int. Cl.² .............................................. B65B 13/20
[52] U.S. Cl. ........................................... 100/5; 100/88
[58] Field of Search ............... 100/5, 13, 88; 192/150; 74/625

[56] References Cited

U.S. PATENT DOCUMENTS

| | | | |
|---|---|---|---|
| 1,203,082 | 10/1916 | Van Houten | 192/150 |
| 1,583,889 | 5/1926 | Lariviere | 192/150 |
| 2,541,529 | 2/1951 | McVicker | 74/625 |
| 2,856,999 | 10/1958 | Wilhelm | 192/150 |
| 3,528,320 | 9/1970 | Maniker | 74/625 |
| 3,910,178 | 10/1975 | Eggers | 100/5 |
| 3,913,473 | 10/1975 | Meiers | 100/5 |

Primary Examiner—Billy J. Wilhite
Attorney, Agent, or Firm—John B. Mitchell; Frank A. Seemar; Joseph A. Brown

[57] ABSTRACT

An improved twine wrapping mechanism is provided for a roll forming machine having a frame defining a roll forming region. The twine wrapping mechanism includes an elongated dispensing tube and means for mounting the dispensing tube forwardly of the bale forming region on the frame such that the tube can be driven in a predetermined path across the bale forming region. The tube is fastened at one end to a gear segmented plate which is supported on one end of a shaft rotatably mounted on the frame. The dispensing tube is adapted to be driven along its predetermined path either manually by a handle having a gear segment that driveably mates with the gear segmented plate or automatically by a hydraulic cylinder that is operably connected to the shaft that rotatably supports the plate and the tube.

9 Claims, 6 Drawing Figures

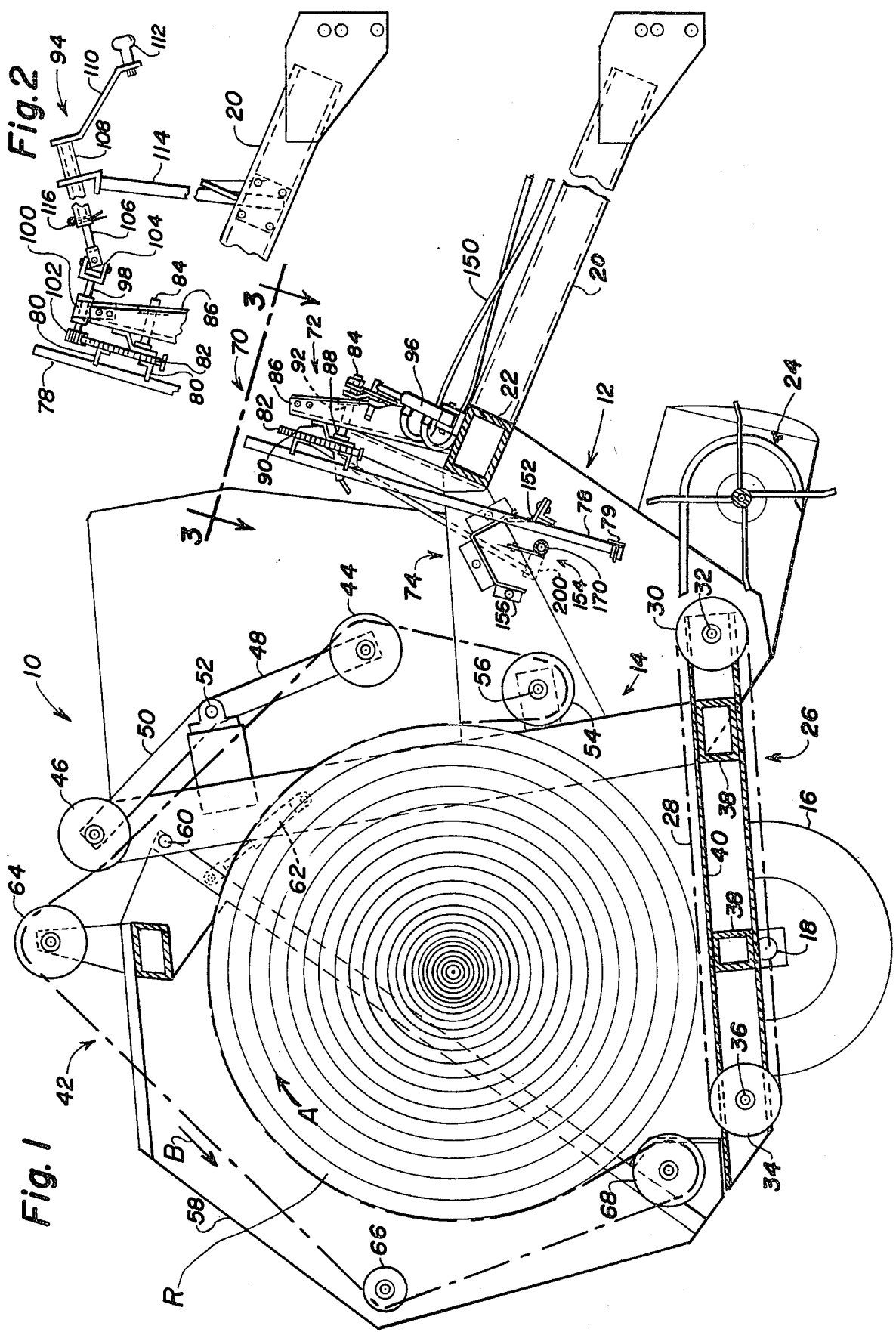

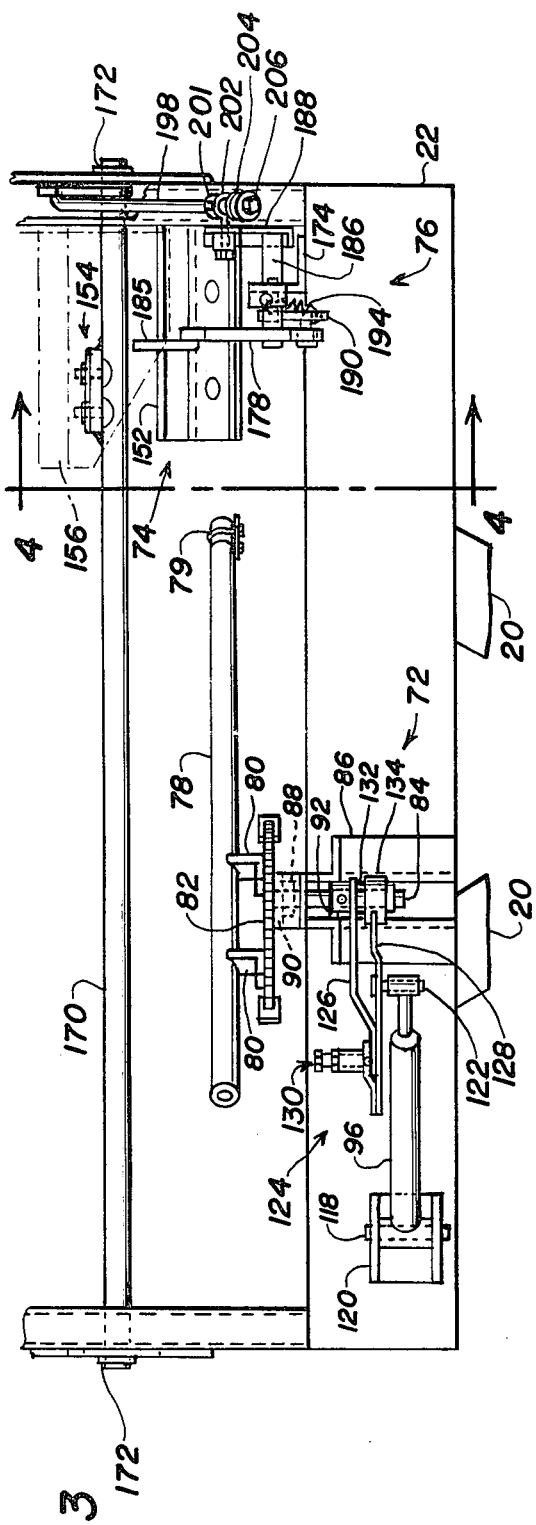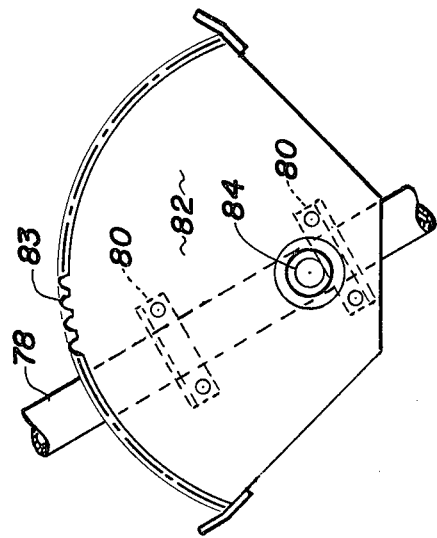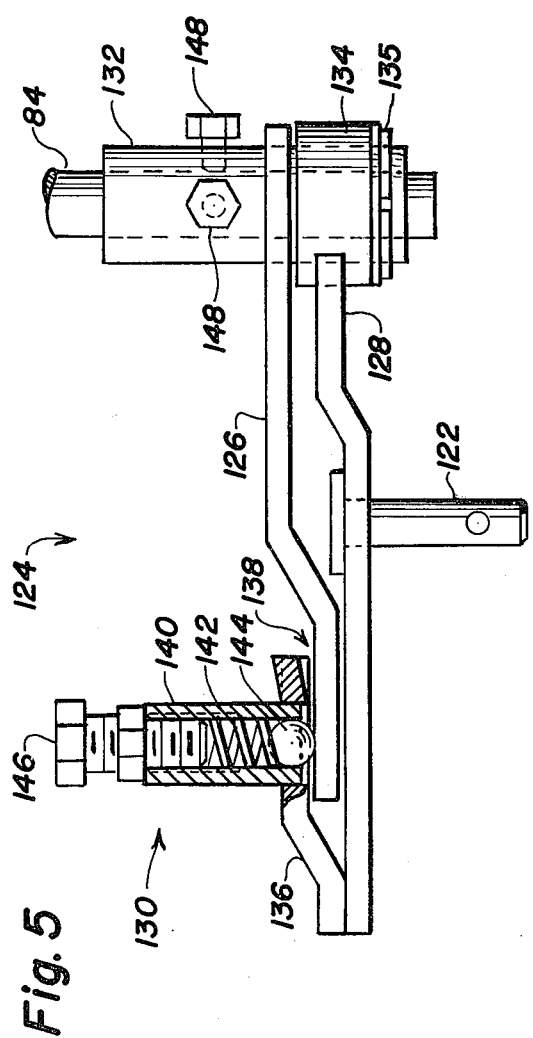

TWINE WRAPPING MECHANISM FOR A ROLL FORMING MACHINE

CROSS REFERENCE TO RELATED APPLICATIONS

Reference is hereby made to the following co-pending U.S. applications dealing with related subject matter and assigned to the assignee of the present invention:

"An Improved Twine Wrapping Mechanism for a Roll Forming Machine" by Lowell R. Grube et al., U.S. Ser. No. 718,712, filed Aug. 30, 1976.

BACKGROUND OF THE INVENTION

1. Field of the Invention

The present invention relates generally to a roll forming machine, and more particularly, is directed to an improved mechanism for wrapping twine or the like about a roll formed within the roll forming machine.

2. Description of the Prior Art

In recent years, the practice of harvesting crop material such as hay or the like by forming it into large rolls through the use of large roll or round balers has become increasingly popular. One type of large round baler forms a swath or windrow of hay into a large cylindrical roll or round bale while the latter is supported on the ground. Another type of large round baler picks up the swath or windrow of hay and forms it into a large round bale off the ground. Both of these types of large round balers generally have mechanisms for applying twine or similar binding material about the bale once it has reached its desired maximum size. The wrapped bale is then discharged from the baler.

Generally, the twine wrapping mechanism employed by these large round balers includes an elongated tube which oscillates in a predetermined path across the bale forming region to dispense twine as the twine is wrapped about the bale. In the past, the twine dispensing mechanisms have been of the type which are manually operated such as the one illustrated in U.S. Pat. No. 3,910,178 or automatically operated by a hydraulic cylinder such as the one illustrated in U.S. Pat. No. 3,913,473.

The manual and the automatic twine wrapping mechanisms each have their own advantages and features. The automatic or hydraulic driven wrapping mechanism, generally more costly then the manual operated mechanisms, is especially suitable to those customers that have tractors with cabs because it is practically impossible to negotiate the controls of a manual wrapping mechanism.

Up to now, the round baler customer had to accept, at the time of purchase of a particular baler, the type of wrapping mechanism that happened to be on the particular baler he purchased and could not choose the type of wrapping mechanism he desired nor did the customer have the option of later changing to some other type of wrapping mechanism for his baler.

SUMMARY OF THE INVENTION

The present invention gives the round baler customer the choice of selecting the type of twine wrapping mechanism he desires when purchasing a new round baler, and further, gives him the option of readily converting the type of wrapping mechanism on his baler to another without considerable cost or the expense of time and materials. Accordingly, the invention provides a round baler with an improved twine wrapping mechanism which is adapted to be actuated either manually or automatically by a power motor, such as a hydraulic cylinder.

Specifically, the improved twine wrapping mechanism includes an elongated dispensing tube mounted at one of its ends on a plate having a gear segmented portion. The gear segmented plate is mounted on a shaft rotatably supported on the frame of the roll forming machine. Rotation of the plate and thus movement of the dispensing tube along a predetermined path across the roll forming region of the roll forming machine is effectuated either through movement of the gear segmented plate by a manually actuated handle, having a gear segment that driveably mates with the gear segmented portion of the plate or by rotating the shaft, that supports the plate, and, thus moving the dispensing tube through the use of a power motor such as a hydraulic cylinder which is operably connected to the shaft.

The present invention further includes the feature of a breakaway mechanism for the situation wherein the customer selects the hydraulically driven twine wrapping mechanism. The breakaway mechanism maintains the integrity of the components of the twine wrapping mechanism and thus prevents any damage thereto should the elongated dispensing tube encounter any impassable obstacles during its travel along its predetermined path.

Other advantages and attainments of the present invention will become apparent to those skilled in the art upon a reading of the following detailed description when taken in conjuction with the drawings in which there is shown and described an illustrative embodiment of the present invention.

BRIEF DESCRIPTION OF THE DRAWINGS

In the course of the following detailed description, reference will be frequently made to the attached drawings in which:

FIG. 1 is a right side elevational view of a crop material roll forming machine embodying the improved twine wrapping mechanism of the present invention, showing a hydraulic cylinder for automatically operating the improved twine wrapping mechanism.

FIG. 2 is a fragmentary view of the improved twine wrapping mechanism, showing in fragmentary form a component, for manually operating the improved twine wrapping mechanism.

FIG. 3 is an enlarged fragmentary plan view of the improved twine wrapping mechanism as seen along line 3—3 of FIG. 1.

FIG. 5 is an enlarged plan view, partly in section, a breakaway mechanism which is associated with the hydraulic cylinder in FIG. 3, with the cylinder being omitted and showing a rotatable shaft of the improved twine wrapping mechanism in fragmentary form.

FIG. 6 is an enlarged diagrammatic view of a fragmentary portion of the improved twine wrapping mechanism, showing a gear segmented mounting plate with the twine dispensing tube mounted thereon, the gear segment of the plate being for drivingly coupling the plate with the manually operative component as seen in FIG. 2.

DETAILED DESCRIPTION OF THE INVENTION

Figure 4:
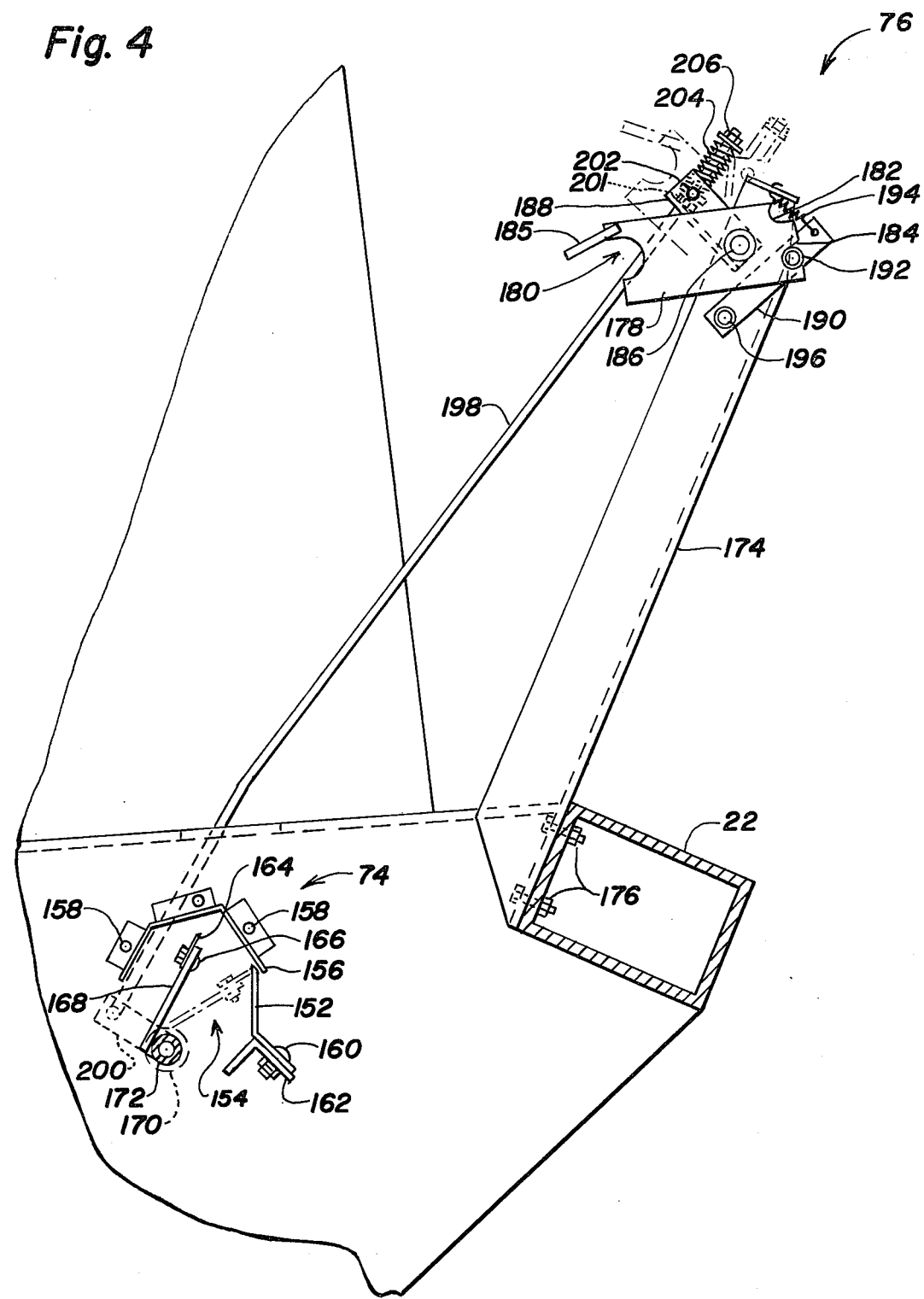
FIG. 4 is a side elevational view of the severing means and the latch means of the improved twine wrapping mechanism as seen along line 4—4 of FIG. 3, with the severing knife being represented in solid-line form in its open position and in broken-line form in its closed position and with the latch plate being represented in solid-line form in its tube receiving position and in broken-line form in its tube holding position.

In the following description, right hand and left hand references are determined by standing at the gear of the machine and facing in the direction of forward travel. Also, in the following description, it is to be understood that such terms as "forward," "left," "upwardly," etc., are words of convenience and are not to be construed as limiting terms.

IN GENERAL

Referring now to the drawings, and particularly to FIG. 1, there is shown a crop material roll forming machine, generally indicated by numeral 10, being provided with a base frame, generally designated 12, having right and left sides (the right side being omitted for clarity) between which extends a roll forming region, being generally designated by 14 and within which a completed roll R is illustrated. The frame 12 is supported and made mobile by right and left ground-engaging wheels 16 (only the left one being shown) rotatably mounted respectively on spindles 18 (only the left one being shown), being connected to and extending outwardly from respective opposite sides of the machine 10.

The machine 10 is adapted to be connected to a tractor (not shown) for towing the machine forwardly across a field in field operation or road transport by means of a tongue 20 which is connected at its rear end to and extends forwardly from a horizontal beam 22 of the frame 12. Horizontal beam 22 extends transversely between and interconnects with the opposite sides of frame 12.

Extending forwardly from the lower front portion of the mobile frame 12 of the machine 10 is a pickup 24. The pickup 24 is adapted to engage, elevate and rearwardly feed a swath or windrow of crop material into the roll forming region 14 of the machine 10. The material fed by the pickup 24 is passed rearwardly to the front end of a lower apron, generally indicated by the numeral 26.

The lower apron 26 is formed by a series of endless flexible lug-bearing chains 28 which are transversely spaced apart even distances and which extend around front drive sprockets 30 mounted on front saft 32 rotatably supported between the sides of the frame 12 at the front thereof. The chains 28 also pass around rear idler sprockets 34 mounted on shaft 36 rotatably supported between the sides of the frame 12 at the rear thereof.

Mounted upon fore-and-aft spaced transverse members 38 of the base frame 12 is a floor 40. The floor 40 is rigid and generally horizontally disposed. The upper course of the lower apron chains 28 move in a rearward directon across the floor 40 to convey the crop material received from the pickup 24 toward the rear of the machine 10.

The lower course of an upper apron assembly, being generally designated by the numeral 42, engages and directs the material reaching the rear end of the frame 12 into an upward and forward direction to effect, in combination with the lower apron 26 at the roll forming region 14 of the machine 10, a rolling of the crop material into roll R in the direction of the arrow A of FIG. 1. During roll forming, as the lower and upper courses of the upper apron 42 move respectively in the directions of the arrows A and B in FIG. 1, it will be understood that the lower course of the upper apron 42 is capable of expanding as the roll R expands in diameter. This is allowed by idler sprockets 44 and 46, which movably support portions of the upper course of apron 42, being mounted upon arms 48,50 disposed adjacent each side of the frame 12 and supported on a transverse shaft 52 rotatably mounted between the sides of frame 12 at the upper portions thereof. The arms 48,50 are biased by extension springs (not shown) mounted along the frame sides which normally position the upper apron 42 in a contracted condition wherein the lower course thereof is adjacent the lower apron 26, but are yieldable for allowing the aforementioned expansion of the lower course during roll formation.

The upper apron 42 also extends about front drive sprockets 54 mounted on a shaft 56 rotatably supported between the sides of the frame 12 at the front portion thereof.

The base frame 12 also includes a rear upper frame or tailgate assembly 58 which is pivotally connected at 60 to the upper portions of the sides of the frame and extends transversely therebetween. The tailgate assembly 58 is pivotally moved clockwise from its lower roll forming position, as shown in FIG. 1, to an upper discharge position (not shown) by a pair of hydraulic cylinders 62 (only the left one being shown) respectively mounted on and extending along the sides of the frame 10. The tailgate 58 rotatably mounts upper, rear, and lower idler sprockets 64,66 and 68 respectively about which the upper apron 42 also extends.

For providing rotary power to the pickup 24 and the lower and upper aprons 26,42 an input driveline (not shown) is provided along the tongue 20 being adapted for connection at its forward end to the power takeoff (PTO) shaft of the tractor for rotation in unison therewith to supply rotary driving power to various of the operative components of the machine through power transmitting components (not shown). The hydraulic cylinders may be suitably connected to hydraulic sources on the tractor.

IMPROVED TWINE WRAPPING MECHANISM

In order that the roll R may be stabilized when discharged from the machine 10, the machine is provided with a supply of twine or the like, not shown, located on the right sidewall of frame 12. The twine is applied to the roll R by a twine wrapping mechanism, which incorporates the improvement provided by the present invention and is generally designated by the numeral 70 in FIG. 1, just before the upper frame or tailgate 58 is pivoted to its upper position for discharge of the roll R from the machine 10.

The improved wrapping mechanism 80, generally includes a twine dispensing assembly, generally indicated by the numeral 72, and selective components for actuating the assembly 72 which comprise the parts of the improved mechanism 70 constituting the present invention. Also, the wrapping mechanism 70 includes twine severing means, generally indicated by the numeral 74, and latch means, generally indicated by numeral 76, interconnected to the severing means 74 and cooperative with the twine dispensing assembly 72 for effecting control of the severing means 74 in response to movement of the dispensing assembly 72 for severing the twine after the roll has been externally wrapped. The severing means 74 and the latch means 76, being interconnected to the severing means 74 and cooperative with the dispensing assembly 72 for effecting control of the severing means 74, are the parts of the improved wrapping mechanism 70 which comprise the invention claimed in a copending patent application cross-referenced above; however, such parts are illustrated and will be described later on in detail herein for facilitating a thorough and complete understanding of the present invention.

The twine dispensing assembly 72 is positioned forwardly of the roll forming region 14 and generally includes an elongated dispensing tube 78 having a twine tensioning device 79 attached to its free end for applying tension to the twine as it is dispensed across the bale forming region 14. Twine from the supply is routed through means not shown through the receiving end of the tube 78 with a short length of twine extending or dangling from the opposite free end of the tube 78.

The twine receving end of the tube 78 is fixed by brackets 80 (see FIG. 6) to one side of a plate 82 having an outer peripheral edge gear portion 83. The plate 82 is mounted on one end of a rotatably supported shaft 84 that extends normal to the plate 82. The shaft 84 protrudes through the upper end portion of an upright support member 86 being secured to the transverse frame member 22 and is rotatably supported within two bearings, one bearing 88 which is secured to the upright member 86 by a bracket 90 and another bearing 92 supported within the upright member 86. The mounting of the tube 78 to the plate 82 is such that upon rotation of the shaft 84 and the plate 82 and tube 78 therewith the free end of the tube 78 moves in a predetermined path across the roll forming region 14.

Further and in accordance with the principles of the present invention, the above described mounting of the dispensing tube 78 enables the free end of the tube to be moved along its predetermined path by a selected one of two different actuating components; namely, either a manually operable component 94, as seen fragmentarily in FIG. 2, or automatically by a power motor component, such as the hydraulic cylinder 96 as seen in FIGS. 1 and 3.

For manual operation of the twine dispensing tube 78, the manually operable component 94, as best seen in FIG. 2, includes a drive shaft 98 journalled for rotation within a bearing 100 supported on the top edge of the upright member 86. One end of the drive shaft 98 mounts a gear 102 which driveably mates with the gear portion 83 of the plate 82 whereas the other end of the drive shaft 98 mounts one part of a universal joint 104 whose other part is mounted on the end of rod 106. The rod 106 extends within a telescoping sleeve 108 which is secured to a crank handle 110 having knob 112. The sleeve 108 is supported on member 114 which extends upwardly from the forward portion of the tongue 20. A cotter pin 116 is extended through corresponding apertures provided in the sleeve 108 and the rod 106 for driveable connection thereof such that manual rotation of the crank handle 110 rotates the gear 102 which moves the gear portion 83 and thereby rotates the plate 82 and the shaft 84 resulting in pivotal movement of the dispensing tube 78 along its predetermined path.

The twine dispensing tube 78, due to its above-described unique mounting means, is also adapted to be actuared automatically by a power motor component such as hydraulic cylinder 96. As best seen in FIGS. 1 and 3, a pin 118 pivotally mounts the base end of the hydraulic cylinder 96 on a bracket 120 secured to the transverse frame member 22. The piston end of cylinder 96 is pivotally connected by pin 122 to a breakaway mechanism, generally indicated by the numeral 124 and best seen in FIG. 5, that operably interconnects the hydraulic cylinder 96 to the twine dispensing assembly 72. The breakaway mechanism 124 also comprises a part of the present invention. The purpose of the breakaway mechanism 124 is to disconnect the cylinder 96 from the assembly 72 under conditions wherein the load on the shaft 84 exceeds a predetermined value. Such breakaway mechanism is beneficial in preventing damage to the components of the dispsensing assembly 72, as well as, damage to the other components of the wrapping mechanism 70, such as the severing means 74 and latch means 76.

In particlar reference to FIG. 5, the brakaway mechanism 124 comprises an arrangement of components adapted to interconnect the hydraulic cylinder 96 to the dispensing assembly 72, and as such, broadly includes a first lever 126, a second lever 128 and means, generally designated by the numeral 130, for coupling the first lever 126 to the second lever 128. The first lever 126 has one end fixedly mounted to a sleeve 132 and the second lever 128 has its corresponding end mounted to a hub 134 which is adapted to be inserted over the sleeve 132 and retained thereon by snap ring 135, adjacent to the fixed end of the first lever 126. The other end of the second lever 128 contains a stub member 136 secured thereto, such as by welding or the like, forming slot 138 for receiving the free end of the first lever 126. The coupling means 130 includes an internally threaded tube 140 that houses a coil spring 142 and an engaging ball 144. The threaded tube 140 is secured within a bore provided in the stub member 136 such that the engaging ball 144 can be urged outwardly into engagement with the free end of the first lever 126 as an adjustment bolt 146 is threaded in the tube 140 to compress the spring 142 and preset the torque load at which the breakaway mechanism 124 reacts. The engaging ball 144 is of a diameter greater than the width of the sot 138 such that the ball 144 will not be lost but confined within the slot 138 upon reaction of the breakaway mechanism 124 wherein the free end of the first lever 126 moves from within slot 138.

When the hydraulic cylinder 96 is utilized to actuate the dispensing tube 78 of the dispensing assembly 72, the sleeve 132 is inserted over shaft 84 and retained thereon by retaining bolts 148. Hydraulic hoses 150 from the hydraulic cylinder 96 are connected to the hydraulic system of a tractor (not shown) for powering the cylinder. Preferably, the hydraulic cylinder 96 is of the double actuation type, and thus, as the piston rod end of the cylinder 96 is extended, it moves the second lever 128 which is coupled to the first lever 126 by the coupling means 130, thereby rotating shaft 84 in a clockwise direction as viewed in FIG. 3. As shaft 84 rotates in a clockwise direction, the plate 82 rotates therewith resulting in a corresponding pivotal movement of the dispensing tube 78. Retraction of the piston rod end of the hydraulic cylinder 96 rotates the shaft 84 and the plate 82 therewith in a counterclockwise direction as viewed in FIG. 3, with corresponding pivotal movement of the dispensing tube 78. Should the dispensing tube 78 encounter any impassable obstacles that would create a torque load in excess of a predetermined value set by the compression load of the spring 142 on ball 144, the breakaway mechanism 124 reacts in decoupling the first lever 126 from the second lever 128 and thus the first lever 128 pivots about its hub 134 around the sleeve 132.

In preparation for the roll wrapping operation, once the roll R has reached its desired size, the operator normally stops further forward movement of the machine 10 to interrupt the flow of material delivered by the pickup mechanism 24. Concurrently, the operator actuates the twine dispensing assembly 72, whether that being the hydraulic cylinder 96 or the manual handle 94, wherein the twine dispensing tube 78 is swung along its predetermined arcuate path from the left to the right side of the machine and then returned to its initial rest position on the left side of the machine. In its initial rest position, the tube 78 is disposed generally parallel to the transverse frame member 22, forwardly of the bale forming region 14, and with the free end of the tube 78 being disposed adjacent the left side of the machine 10. The predetermined arcuate path of the tube 78 is best described as being first a slightly rearward and generally downward movement toward the right side of the bale forming region 14 and then is returned therefrom in a generally upwardly and slightly forward movement to its rest position. Further, it should be pointed out at this time that the dispensing tube 78, at least during a portion of its cyclic movement, is guided along the underside of tubular member 170 which will be described in conjunction with the description of the severing means 74.

As the tube 78 swings back and forth across the bale forming region 14 the twine is deposited on the lower apron 26 or if there is still crop material moving into the machine, the twine is deposited thereon and is intermeshed therwith. The twine is then caried rearwardly into the bale forming region 14 wherein it is exteriorly wrapped around the roll R as the roll is rotated. Since the dispensing tube 78 swings from one side to the other side of the machine as the roll R is rotated, the winding will obviously be in the form of a spiral.

The parts of the improved wrapping mechanism 70 which comprise the invention claimed in the above cross-referenced copending application will now be described.

Preparation for severing the twine occurs as the tube 78 approaches the end of its return cycle wherein the twine is brought into the vicinity of the severing means 74. The severing means 74 includes a striker plate 152, a severing knife 154 and a guide shield 156 which is attached by screws 158 to the left sidewall of the machine, projects outwardly therefrom over the striker plate 152 and knife 154, and has a front edge tapered so as to guide the twine over the striker plate 152 as the tube 78 approaches its return cycle. The striker plate 152 is attached in a stationary position by bolts 160 to a transverse stub member 162 secured to the left sidewall of the machine, below the guide shield 156. The knife 154 is pivotally mounted rearwardly of the striker plate 152 so as to be moved away from and toward the striker plate 152 in an abutting severing relationship therewith. The knife 156 includes a blade 164 attached by bolts 166 to one end of an arm 168 which is secured to tubular member 170 for rotation therewith about shaft 172. The tubular member 170 is inserted over shaft 172 which extends transversely between the opposite sidewalls of the machine and is suitably mounted at each of its ends within the respective sidewalls.

Latch means 76 has been provided for coordinating the pivotal movement of the knife 154 toward and away from the striker plate 152 in response to the dispensing tube 78 being pivoted from its rest position along its predetermined path. As best seen in FIG. 4, the latch means 76 is supported on the upper end of upright member 174 which is attached by fastening elements 176 to the transverse frame member 22 and includes a first rectangular latch plate 178 having one edge provided with a tube receiving slot 180 and its opposite edge provided with a pair of positioning notches 182,184. Bar 185 is secured to the end of the plate 178 having slot 180 and projects outwardly therefrom in further defining the tube's receiving area provided by the slot 180. The latch plate 178 is secured to one end of a short transverse shaft 186 which extends through the upper end portion of the upright member 174 and is rotatably mounted thereon. The other end of shaft 186 supports crank arm 188. Biasing lever 190 is provided with abutting knob 192 that projects outwardly from one side thereof toward the latch plate 178 for registering with the positioning notches 182,184 of the latch plate. One end of lever 190 is connected by spring 194 to the upper portion of the upright member 174 whereas the other end of lever 190 is pivotally mounted on the upright member 174 by pin 196, located below shaft 186.

An interconnecting rod 198 is provided for coordinating the movement of the knife 154 in response to movement of the latch plate 178. More particularly, the knife 154 is pivoted toward the striker plate 152 as the latch plate 178 is moved from its tube receiving position to its tube holding position as respectively shown in solid-line form and broken-line form in FIG. 4. The rod 198 is connected at its lower end to a crank arm 200, secured to tubular member 170, and extends upwardly and forwardly therefrom between portions of the left sidewall of the machine. The upper end of the rod 198 carries nut 201 and extends through an eye bolt 202 and spring 204. Spring 204 is coiled about rod 198 and confined within a state of compression between the eye bolt 202 and a retaining nut 206 threaded on the end of the rod 198. The eye bolt 202 is fasten to crank arm 188 for movement therewith as it is pivoted on shaft 186.

During the roll forming operation, the dispensing tube is normally in its rest position, being disposed generally parallel to the transverse frame member 22, with its free end or dispensing end being held in slot 180 as the latch plate 178 is in its tube holding position as shown in broken line form in FIG. 4. In such tube holding position of the latch plate 178, the knife 154 is abutting the striker plate 152 with the free end of the twine being clamped therebetween.

When the roll R has been formed, the operator actuates the twine dispensing assembly 72 wherein the twine dispensing tube 78 is pivoted from its rest position along its predetermined path. As the tube 78 moves rearwardly, the latch plate 178 pivots rearwardly to its tube receiving position wherein the abutting knob 192 registers with notch 184 to retain the latch 178 in such position. Further, as the latch plate 178 pivots, the crank arm 188 pivots forcing the eye bolt 202 against the nut 201 which in turn forces the rod 198 downwardly whereby the crank arm 200 is pivoted rearwardly in driving the knife 154 away from the striker plate 152. As the knife 154 moves away from the striker plate 152, the free end of the twine is released therefrom and free to be carried by the dispensing tube 78 back and forth across the roll forming region 14. As the tube 78 approaches its rest position, on its return cycle, the twine is guided over the striker plate 152 by the guide shield 156. Then, as the tube 78 is driven into the latch plate 178, the plate 178 pivots forwardly to its rest position wherein abutting knob 192 registers with retaining notch 182. This forward pivotal movement of the latch plate 178 pivots the crank arm 188 and the eyebolt 202 forwardly compressing the spring 204 against the retaining nut 206 which forces rod 198 forwardly to pivot the crank arm 200 forwardly resulting in driving the knife 154 toward the striker plate 152. The spring 204 urges the knife 154 against the striker plate 152 to pinch the twine therebetween. The rotation of the roll R as shown by the arrow in FIG. 1, pulls the twine over the knife 154 resulting in severance of the twine. The portion of the twine rearwardly of the cut being pulled into the roll forming region 14 by the rotating roll R, while the forward end of the severed twine remains clamped between the knife 154 and striker plate 152 as the dispensing tube remains in its rest position.

It is thought that the invention and many of its attendant advantages will be understood from the foregoing description and it will be apparent that various changes may be made in form, construction and arrangement of the improved twine wrapping mechanism without departing from the spirit and the scope of the invention or sacrificing all of its material advantages, the form hereinbefore described being merely a preferred or exemplary embodiment thereof.

Having thus described the invention, what is claimed is:

1. A roll forming machine for crop materials comprising:
   a. a mobile frame;
   b. means on said frame defining a roll forming region;
   c. a dispensing mechanism for feeding wrapping material in a predetermined path across said roll forming region, said dispensing mechanism including a dispensing tube;
   d. a support means rigidly fixed to said frame; and
   e. mounting means selectively movably connecting said dispensing mechanism to said support means, said mounting means including a gear segmented plate rigidly supporting said dispensing tube, and a shaft member interconnecting said plate and said support means whereby upon rotation of said plate by the movement of said gear segment by either a manually actuated component or rotation of said shaft by a power motor component said dispensing tube moves in a predetermined path to dispense the wrapping material across said roll forming region.

2. The roll forming machine as described in claim 1 wherein said manually actuated component includes a handle having a gear segment fixed thereto that driveably mates with said gear segment of said plate so as to rotate said plate and said shaft on said support means as said handle is manually rotated.

3. The roll forming machine as described in claim 1 wherein said power motor component includes a hydraulic cylinder and means for operably connecting said hydraulic cylinder to said shaft so as to cause rotation of said shaft and thereby movement of said tube in a predetermined path upon operation of said hydraulic cylinder.

4. The roll forming machine as descrived in claim 3 further comprising:
   a breakaway mechanism for interconnecting said hydraulic cylinder to said shaft to said mounting means, said breakaway mechanism being operable to transmit a predetermined torque load to said shaft for rotation of the same and inoperable to transmit torque loads above said predetermined torque load.

5. A roll forming machine for crop materials comprising:
   a. a mobile frame;
   b. means on said frame defining a roll forming region;
   c. a dispensing mechanism for feeding wrapping material in a predetermined path across said roll forming region, said dispensing mechanism including an elongated dispensing tube having a first end and a second end;
   d. a support means rigidly fixed to said frame;
   e. mounting means selectively movably connecting said dispensing mechanism to said support means, said mounting means including a gear segmented plate rotatably mounted on said support means;
   f. said first end of said elongated dispensing tube fixed to said gear segmented plate such that upon rotation of said segmented plate said second end of said elongated tube travels along a predetermined path to dispense wrapping material across said roll forming region; and
   g. said gear segmented plate being rotated upon said support means by the force transmitted through a manually actuated handle having a gear segment that drivably mates with said gear segmented plate or through a power motor component that is operably coupled to said plate.

6. The roll forming machine as described in claim 5, wherein:
   said mounting means includes a shaft which rotatively mounts said gear segmented plate on said support means; and
   said power means component includes a hydraulic cylinder operably connected between said frame and said shaft such that upon operation of said hydraulic cylinder said shaft and said plate are caused to rotate causing the free end of said elongated dispensing tube to travel along its predetermined path.

7. The roll forming machine as described in claim 6 further comprising:
   means interconnecting said shaft and said hydraulic cylinder for providing a breakaway interconnection between the same whereby the drive force transmitted by said hydraulic cylinder to said shaft for rotation of said shaft will be interrupted should any impassable obstacle be encountered by said elongated dispensing tube during its predetermined path of travel.

8. An improved twine dispensing mechanism for a roll forming machine comprising:
   a. an upright support member mounted on the frame of said machine;
   b. an elongated dispensing tube for dispensing a wrapping material;
   c. a shaft rotatively mounted on said support member; and
   d. a plate having an outer peripheral gear segment, said elongated tube having one end mounted on said plate, said plate being mounted on one end of said shaft and adapted to be connected to a manually actuatable handle having a drive gear supported on one end thereof which upon manual actuation of said handle driveably mates with the outer peripheral gear segment of said plate causing the same to rotate with said shaft about said support member whereby said free end of said elongated dispensing tube is moved in a predetermined path across said roll forming machine;

e. said other end of said shaft being adapted to be connected to a power motor means such as a hydraulic cylinder whereby upon actuation of said hydraulic cylinder said shaft is rotated causing said elongated dispensing tube to pivot along a predetermined path across said roll forming machine.

9. The roll forming machine as described in claim 8, further comprising a breakaway mechanism interconnecting said hydraulic cylinder to said dispensing mechanism, said breakaway mechanism being operably to disconnect the hydraulic cylinder from said dispensing mechanism should said dispensing tube encounter any impassable obstacles during its predetermined path of travel.

* * * * *